United States Patent
Si et al.

(10) Patent No.: US 11,207,848 B2
(45) Date of Patent: Dec. 28, 2021

(54) BUFFERING GAS CUSHION MACHINE

(71) Applicant: HANGZHOU BING JIA TECHNOLOGY CO., LTD, Zhejiang (CN)

(72) Inventors: Kuangshu Si, Zhejiang (CN); Yugui Liu, Zhejiang (CN); Yuan Li, Zhejiang (CN); Guian Si, Zhejiang (CN)

(73) Assignee: HANGZHOU BING JIA TECHNOLOGY CO., LTD, Hangzhou (CN)

( * ) Notice: Subject to any disclaimer, the term of this patent is extended or adjusted under 35 U.S.C. 154(b) by 393 days.

(21) Appl. No.: 16/314,158

(22) PCT Filed: Jul. 15, 2016

(86) PCT No.: PCT/CN2016/090168
§ 371 (c)(1),
(2) Date: Dec. 28, 2018

(87) PCT Pub. No.: WO2018/000465
PCT Pub. Date: Jan. 4, 2018

(65) Prior Publication Data
US 2019/0240921 A1    Aug. 8, 2019

(30) Foreign Application Priority Data
Jul. 1, 2016    (CN) .......................... 201620704653.2

(51) Int. Cl.
*B29C 65/00* (2006.01)
*B29C 65/02* (2006.01)
(Continued)

(52) U.S. Cl.
CPC .............. *B29C 66/84* (2013.01); *B29C 65/02* (2013.01); *B29C 65/7894* (2013.01);
(Continued)

(58) Field of Classification Search
CPC ... B29C 66/84; B29C 65/7894; B29C 66/439; B29C 66/492; B29C 66/87; B29C 65/02;
(Continued)

(56) References Cited

U.S. PATENT DOCUMENTS 4,757,668 A * 7/1988 Klinkel ................... B29C 65/02
53/374.6
2002/0166788 A1* 11/2002 Sperry .............. B29C 66/83413
206/522
(Continued)

FOREIGN PATENT DOCUMENTS

CN    202574677 U    12/2012
CN    103307442 A    9/2013
(Continued)

OTHER PUBLICATIONS

Machine Translation (EPO/Google) of Xiamen Ameson Packaging Co. Ltd., CN202574677 (published Dec. 5, 2012) (Year: 2021).*
(Continued)

*Primary Examiner* — Cynthia L Schaller
(74) *Attorney, Agent, or Firm* — Innovation Capital Law Group, LLP; Vic Lin (57) ABSTRACT

Disclosed is a buffering air cushion machine, wherein the angle between a heat-sealing cooling transmission module as a core component of the buffering air cushion machine and a horizontal plane is between 20-50 degrees, thus greatly decreasing the transverse dimension of the buffering air cushion machine, so as to decrease the size of the whole machine and decrease the space occupied by the buffering air cushion machine; an inflation guide rod of a bent type may release some tension on a sealing side (an inflating passage) of a air cushion film, and may prevent wrinkles and bends from forming on the sealing side of the air cushion film during heat-sealing, so as to improve the quality of heat-sealing; furthermore, an upper coiling film guide rod
(Continued)

and a lower coiling film guide rod may block the inflating passage connecting two air cushion films, and may prevent the air in the air cushion film which is filled with air but not sealed yet from travelling forward, so as to form a sealed high-pressure region and maintain the pressure in an inflation region, thus maintaining the pressure in the air cushion film after heat-sealing.

16 Claims, 9 Drawing Sheets

(51) Int. Cl.
*B31D 5/00* (2017.01)
*B29C 65/78* (2006.01)
(52) U.S. Cl.
CPC .......... *B29C 66/439* (2013.01); *B29C 66/492* (2013.01); *B29C 66/87* (2013.01); *B31D 5/00* (2013.01); *B31D 5/0073* (2013.01); *B31D 2205/0082* (2013.01)
(58) Field of Classification Search
CPC ................................ B31D 5/00; B31D 5/0073; B31D 2205/0082; B31D 2205/0023; B31D 2205/0047
See application file for complete search history.

(56) References Cited

U.S. PATENT DOCUMENTS

| | | | | |
|---|---|---|---|---|
| 2009/0321020 | A1* | 12/2009 | Kim | ...................... B32B 37/203 156/498 |
| 2013/0011510 | A1* | 1/2013 | Chuba | ................. B29C 66/8122 425/324.1 |
| 2015/0239592 | A1* | 8/2015 | Wetsch | ............... B29C 49/0042 53/79 |

FOREIGN PATENT DOCUMENTS

| | | |
|---|---|---|
| CN | 203450429 U | 2/2014 |
| CN | 105129476 A | 12/2015 |
| EP | 1311431 A1 | 5/2003 |

OTHER PUBLICATIONS

International Search Report dated Apr. 7, 2017 from PCT Application No. PCT/CN2016/090168.

* cited by examiner

BUFFERING GAS CUSHION MACHINE

TECHNICAL FIELD

The present utility model relates to a buffering air cushion machine.

BACKGROUND

At present, in the fields of online shopping, logistics, medicine, electronics, etc., the packaging and buffering protection of products are involved. China's domestic packaging of products mainly uses foam, bubble particles, protective linings, paper, etc. to fill or package products. This method is complicated in operation, not environmentally friendly, and time-consuming and labor-intensive, and it is very troublesome in respect of removal. Buffering air bags have been widely used abroad to fill packaging, but foreign products are expensive. Most of the equipments for producing buffering air bags in China are complicated in structure and large in volume, and may not guarantee the flatness of the sealing, with a high scrap rate, so that the demand for the increasingly large filling and buffering packaging market may not be met.

SUMMARY

It is an object of the present utility model to provide a buffering air cushion machine to solve at least one of the above technical problems.

According to an aspect of the present utility model, a buffering air cushion machine is provided, comprising a frame, which is provided with is provided with a barrel, a guide rod, an inflation guide rod and a heat-sealing cooling transmission module, wherein the angle between the heat-sealing cooling transmission module and a horizontal plane is 20-50 degrees, the guide rod comprises an upper coiling film guide rod and a lower coiling film guide rod, the inflation guide rod is of a bent type, a horizontal plane, at which an inflation input end of the inflation guide rod (4) is located, is between an upper horizontal section of the upper coiling film guide rod (31) and a lower horizontal section of the lower coiling film guide rod (32), an output end of the inflation guide rod (4) is paralleily opposite to an inlet end of the heat-sealing cooling transmission module.

In the present utility model, the angle between a heat-sealing cooling transmission module as a core component of the buffering air cushion machine and a horizontal plane is between 20-50 degrees, thus greatly decreasing the transverse dimension of the buffering air cushion machine, so as to decrease the size of the whole machine and decrease the space occupied by the buffering air cushion machine; an inflation guide rod of a bent type may release some tension on a sealing side (an inflating passage) of a air cushion film, and may prevent wrinkles and bends from forming on the sealing side of the air cushion film during heat-sealing, so as to improve the quality of heat-sealing; furthermore, an upper coiling film guide rod and a lower coiling film guide rod may block the inflating passage connecting two air cushion films, and may prevent the air in the air cushion film which is filled with air but not sealed yet from travelling forward, so as to form a sealed high-pressure region and maintain the pressure in an inflation region, thus maintaining the pressure in the air cushion film after heat-sealing.

In some embodiments, the barrel may comprise a barrel body, a fixed shaft, a bearing, a first ring body and a second ring body, wherein one end of the fixed shaft is disposed on the frame; the first ring body is sleeved on the fixed shaft, and the second ring body is sleeved on the fixed shaft; the second ring body is rotatably connected to the fixed shaft, and the barrel body is rotatably connected to the fixed shaft via the bearing; an outer circumference of the second ring body is in contact with an inner wall of the barrel body; the barrel body drives the second ring body to rotate synchronously; a side face of the first ring body is in contact with a side face of the second ring body. Thus, the barrel body is covered with the coiling film consumable, and the second ring body is synchronously rotated while the barrel body rotates; since the side face of the second ring body is in contact with the side face of the first ring body, a constant circumferential frictional force is generated between the second ring body and the first ring body, allowing the constant damping rotation of the barrel body and the second ring body to be ensured, thereby providing a constant tension to the coiling film.

In some embodiments, the barrel body may be provided with an elastic sheet. Thus, the elastic sheet may clamp a sleeve of the coiling film consumable, preventing the coiling film consumable from jumping during the rotation, thereby avoiding the influence on the subsequent inflation heat-sealing.

In some embodiments, the heat-sealing cooling transmission module may comprise an upper heating belt, a lower heating belt, an upper heating module, a lower heating module, an upper cooling module, a lower cooling module, a transmission wheel set, a first driving wheel, a second driving wheel, a first driving means and a second driving means. The upper heating belt and the lower heating belt are sleeved on the transmission wheel set; the upper heating belt and the lower heating belt are symmetrically distributed with respect to the output end of the inflation guide rod; between the upper heating belt and the lower heating belt is formed a conveying passage for the air cushion film; the upper heating module, the upper cooling module and the first driving wheel are sequentially disposed in the conveying direction of the upper heating belt; the lower heating module, the lower cooling module and the second driving wheel are sequentially disposed in a conveying direction of the lower heating belt; the upper heating module and the lower heating module are symmetrically distributed with respect to the output end of the inflation guide rod; the upper cooling module and the lower cooling module are symmetrically distributed with respect to the output end of the inflation guide rod; the first driving wheel and the second driving wheel are symmetrically distributed with respect to the output end of the inflation guide rod; the second driving means drives the first driving wheel and the second driving wheel to rotate; the first driving wheel drives the upper heating belt to move, and the second driving wheel drives the lower heating belt to move; the transmission wheel set is rotatably connected to the frame. The heat-sealing cooling transmission module may further comprise a driving mechanism which drives the upper cooling module to reciprocate in the direction of the lower heating module and perform the clamping or expanding action along with the lower heating module. Thus, the first driving wheel and the second driving wheel drive the upper heating belt and the lower heating belt by friction; the coiling film is penetrated into the inflation guide rod; the inflation guide rod inflates the coiling film; the inflated air cushion film enters between the upper heating belt and the lower heating belt; the air cushion film is conveyed between the upper conveyor belt and the lower conveyor belt; the upper heating module and the lower heating module may heat-seal the inflated air cushion film;

the upper cooling module and the lower cooling module complete the cooling and setting of the heat-sealed air cushion film; the blade on the inflation guide rod may cut the inflated air cushion film to ensure the backward conveying of the air cushion film; when the driving mechanism drives the upper cooling module to be separated from the lower cooling module, the air cushion film between the upper cooling module and the lower cooling module may be removed or the upper heating belt and the lower heating belt may be replaced; when the driving mechanism drives the upper cooling module to contact the lower cooling module, the cooling and setting of the heat-sealed air-cushion film may be completed.

In some embodiments, the driving mechanism may comprise a base, a pressing block, at least one first spring, a cam and a handle. A rotating shaft of the second driving wheel is inserted into the base and is rotatably connected to the base; the base is provided on the frame; a rotating shaft of the first driving wheel is inserted into the pressing block and is rotatably connected to the pressing block; the top of the base is provided with at least one first recess, and the bottom of the pressing block is provided with at least one second recess corresponding to the position of the first recess; one end of the first spring is located in the first recess and the other end thereof is located in the second recess; the first spring is in a compressed state; the bottom of the pressing block is provided with a plurality of positioning rods; the top of the base is provided with a plurality of third recesses; the positioning rods are located in the third recesses and are in clearance fit with the third recesses; the pressing block is located at the top of the base; the cam is provided at the top of the pressing block; the handle drives the cam to rotate; the upper cooling module is disposed on the pressing block via a connecting rod. Thus, the handle is lifted to drive the cam to rotate; at this time, the pressing block above the base may be lifted under the elastic force of the first spring, the pressing block drives the first driving wheel and the upper cooling module to also be lifted upwards; the first driving means drives the upper heating module to move upward; at this time, the upper heating belt and the lower heating belt are separated; the air cushion film between the upper heating belt and the lower heating belt may be removed, and the upper heating belt and the lower heating belt may be replaced; the handle is pressed, and the pressing block moves downwards against the base; at this time, the first driving wheel moves toward the second driving wheel, and the upper cooling module moves towards the lower cooling module, so that the upper heating belt may be closely attached to the lower heating belt, thereby driving the air cushion film to be conveyed, and achieving heat sealing, cooling and setting.

In some embodiments, the driving mechanism may comprise the base, the pressing block, the two first springs, a first beam, a second beam, a limiting member, the cam and the handle. The rotating shaft of the second driving wheel is inserted into the base and is rotatably connected to the base; the base is provided on the frame; the rotating shaft of the first driving wheel is inserted into the pressing block and is rotatably connected to the pressing block; the bottom of the pressing block is provided with the plurality of positioning rods; the top of the base is provided with the plurality of third recesses; the positioning rods are located in the third recesses and are in clearance fit with the third recesses; the pressing block is located at the top of the base; the first beam is provided at the top of the pressing block, and both ends of the first beam extend out of the pressing block; the second beam is provided at the bottom of the base, and both ends of the second beam extend out of the base; the first beam and the second beam are arranged in parallel; one end of one of the first springs is provided on one end of the first beam, while the other end of this first spring is provided on one end of the second beam; one end of the other first spring is provided on the other end of the first beam, while the other end of this first spring is provided on the other end of the second beam; the first spring is in a stretched state; the limiting member comprises a vertical rod and a cross rod; the vertical rod and the cross rod are connected in an L shape; the vertical rod is provided on the first beam; the cam is located below the cross rod; the handle drives the cam to rotate; the upper cooling module is disposed on the pressing block via the connecting rod. Thus, the handle is lifted to drive the cam to rotate, the cam forces the cross rod to be jacked up; at this time, the pressing block above the base may be lifted together, the pressing block drives the first driving wheel and the upper cooling module to also be lifted upwards; the first driving means drives the upper heating module to move upwards; at this time, the upper heating belt and the lower heating belt are separated; the air cushion film between the upper heating belt and the lower heating belt may be removed; moreover, the upper heating belt and the lower heating belt may be replaced; the handle is pressed, the cross rod moves downward under the tension of the two first springs, and the pressing block simultaneously moves downward against the base; at this time, the first driving wheel moves toward the second driving wheel, and the upper cooling module moves towards the lower cooling module, so that the upper heating belt may be closely attached to the lower heating belt, thereby driving the air cushion film for transmission, and achieving heat sealing, cooling and setting; and under the tension of the two first springs, the first driving wheel is always subjected to the pressure in the direction of the second driving wheel, ensuring that the upper heating belt and the lower heating belt are always in close attachment, and that the first driving wheel has sufficient friction to drive the upper heating belt and the second driving wheel has sufficient friction to drive the lower heating belt, so as to avoid slipping; when the first driving wheel and the second driving wheel are worn, the diameters thereof becomes smaller, and the two first springs will automatically pull the first driving wheel toward the second driving wheel, so that the upper heating belt and the lower heating belt are always in a close attachment state.

In some embodiments, the guide rail mechanism may comprise a lifting block, a first linear guide rail, a second linear guide rail, a guide rail substrate, two sets of bolts and second springs. The guide rail substrate is provided with a square opening; the lifting block passes through the square opening and reciprocates up and down in the square opening; the first linear guide rail is provided on the guide rail substrate, and the first linear guide rail is located on one side of the square opening; the second linear guide rail is provided on the guide rail substrate, and the second linear guide rail is located on the other side of the square opening; the first linear guide rail is provided with a first slider, and the first slider reciprocates up and down along the first linear guide rail; the second linear guide rail is provided with a second slider, and the second slider reciprocates up and down along the second linear guide rail; one side of the lifting block is disposed on the first slider, the other side thereof is disposed on the second slider; the first driving means drives the lifting block to reciprocate up and down along the first linear guide rail and the second linear guide rail; the upper heating module is provided on the lifting block and reciprocates up and down along with the lifting block; a driving shaft of the first driving means is provided with a fixed block; the bolt passes through the lifting block and is screwed into the fixed block; the second springs are sleeved on the bolts, and the second springs are located between nuts of the bolts and the lifting block; the guide rail substrate is disposed on the frame. Thus, the first driving means may drive the lifting block and the upper heating module to reciprocate up and down along the first linear guide rail and the second linear guide rail; the lifting block does not sway laterally during the ascending or descending due to the lateral limit of the first linear guide rail and the second linear guide rail, and the lifting block is located in the square opening of the guide rail substrate; during the ascending, when the lifting block touches the upper edge of the square opening, the first driving means stops, and the upper edge of the square opening may eliminate the longitudinal jumping of the lifting block due to inertia; during the descending, when the lifting block touches the lower edge of the square opening, the first driving means stops, and the lower edge of the square opening may eliminate the longitudinal jumping of the lifting block due to inertia; the lifting block does not sway laterally during the ascending or descending, and after the first driving means is stopped, the lifting block does not jump longitudinally, so that the heat-sealing effect of the upper heating module on the lifting block may be ensured; meanwhile the second springs may press the lifting block tightly on the fixed block; in the process that the lifting block and the rotating shaft of the first driving means are descending synchronously, the lifting block does not fall freely, and the second springs may prevent the first driving means from being directly rigidly connected to the lifting block, in order to avoid collision and out-of-step phenomena, and may apply a stable downward pressure to the upper heating module mounted on the lifting block.

In some embodiments, the first driving wheel and the second driving wheel may be rubber wheels. Thus, the rubber wheels are used to drive the upper heating belt and the lower heating belt; when the upper heating belt and the lower heating belt are attached together, the two rubber wheels are in a state of being squeezed and deformed, therefore, the contact area between the rubber wheels on the one hand and the upper heating belt and the lower heating belt on the other hand may be improved, the transmission friction force is improved, and the first driving wheel and the second driving wheel are prevented from slipping.

In some embodiments, the upper heating module may be provided with a heat insulating plate. Thus, the heat insulating plate may effectively reduce the external heat radiation of the upper heating module, reduce the heat loss of the upper heating module, shorten the temperature rise time of the upper heating module, and maintain the temperature of the upper heating module after its temperature rise to a relatively stable temperature, thereby improving the heat-sealing efficiency and the heat-sealing effect of the air cushion film.

In some embodiments, the inflation input end of the inflation guide rod may be provided with at least one inflation hole, the output end of the inflation guide rod may be in communication with a blower of the buffering air cushion machine, and a detachable blade may be provided at the output end of the inflation guide rod. Thus, the inflation hole on the inflation guide rod may inflate the coiling film, and the blade may cut the inflated air cushion film to ensure the backward conveying of the air cushion film, and the detachable blade is easy to replace and install.

In some embodiments, the frame may be provided with an inflation seat, the inflation seat may be is provided with a slot, and the output end of the inflation guide rod may be inserted into the slot and may be detachably connected to the slot. Thus, the inflation guide rod is mounted on the inflation seat by means of plugging; when the inflation guide rod needs to be repaired or replaced (such as replacement of the blade), the inflation guide rod may be disassembled by pulling it out of the slot, and when the inflation guide rod needs to be installed, the inflation guide rod may be inserted into the slot, so that the inflation guide rod may be quickly disassembled and installed on the frame, thereby improving the efficiency of repair and replacement of the inflation guide rod.

DETAILED DESCRIPTION

The present utility model will be further described in detail below with reference to the accompanying drawings.

FIGS. 1 to 15 schematically show the structure of a buffering air cushion machine according to an embodiment of the present utility model.

As shown in FIGS. 1 to 15, the buffering air cushion machine comprises a frame 1, a barrel, a guide rod, an inflation guide rod 4, and a heat-sealing cooling transmission module.

Figure 1:
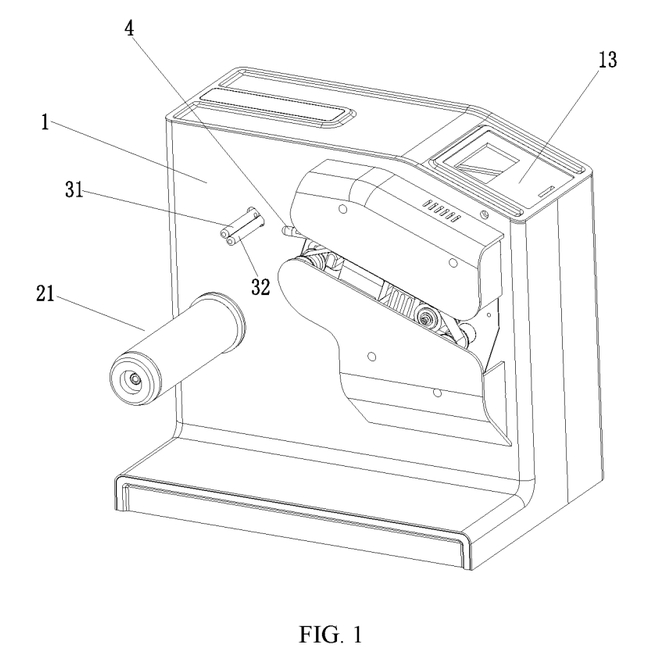
FIG. 1 is a schematic structural view of a buffering air cushion machine according to an embodiment of the present utility model.
Figure 5:
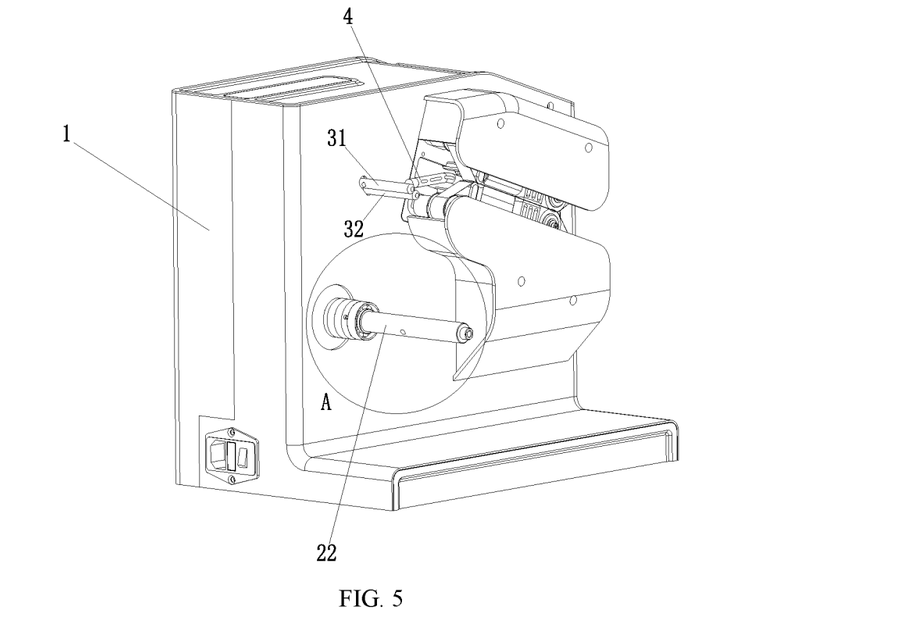
FIG. 5 is a schematic structural view of the buffering air cushion machine shown in FIG. 1, with the barrel body being hidden.
Figure 6:
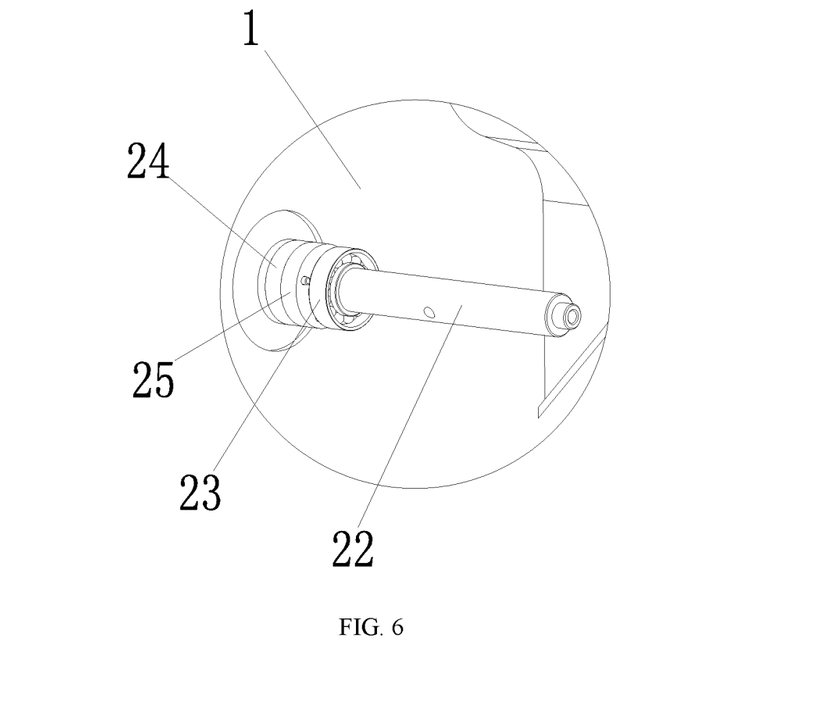
FIG. 6 is a schematic structural enlarged view of a portion A of the buffering air cushion machine shown in FIG. 5.

As shown in FIGS. 1, 5, and 6, the barrel comprises a barrel body 21, a fixed shaft 22, a bearing 23, a first ring body 24, and a second ring body 25.

As shown in FIG. 6, a left end of the fixed shaft 22 is fixed to the frame 1. The first ring body 24 is sleeved on the fixed shaft 22, and the first ring body 24 is fixedly connected to the fixed shaft 22 and may not rotate. The second ring body 25 is sleeved on the fixed shaft 22, the second ring body 25 is rotatable about the fixed shaft 22, and the side face of the first ring body 24 is in contact with the side face of the second ring body 25. When the second ring body 25 rotates, a circumferential frictional damping force may be generated between the first ring body 24 and the second ring body 25. As shown in FIG. 1, the barrel body 21 is rotatably connected to the fixed shaft 22 via the bearing 23; an outer ring of the bearing 23 abuts against an inner wall of the barrel body 1; the outer ring of the bearing 23 and the barrel body 1 may rotate synchronously, that is, the barrel body 1 is rotatable about the fixed shaft 22; an outer circumference of the second ring body 25 abuts against the inner wall of the barrel body 21, that is, the barrel body 21 may drive the second ring body 25 to rotate synchronously. When the barrel body 1 is covered with the coiling film consumable and rotates, the rotation of the barrel body 1 may drive the second ring body 25 to rotate synchronously; since the side face of the second ring body 25 is in contact with the side face of the first ring body 24, a constant circumferential frictional force is generated between the second ring body 25 and the first ring body 24, and the circumferential frictional force ensures constant damping rotation of the barrel body 1 and the second ring body 25, thereby providing a constant tension to the coiling film.

Figure 7:
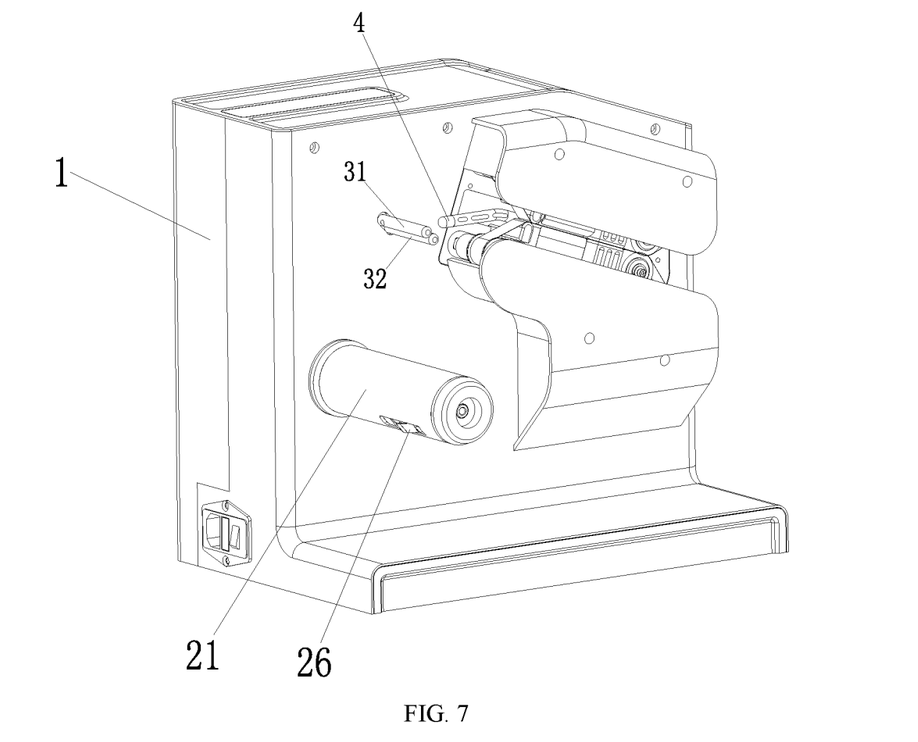
FIG. 7 is a schematic structural side view of the buffering air cushion machine shown in FIG. 1.

As shown in FIG. 7, the barrel body 21 is provided with an elastic sheet 26. One end of the elastic sheet is fixed on the barrel body 21, and the other end thereof may be lifted. The elastic sheet 26 may clamp a sleeve of the coiling film consumable, preventing the coiling film consumable from jumping during the rotation, thereby avoiding the influence on the subsequent inflation heat-sealing.

Figure 2:
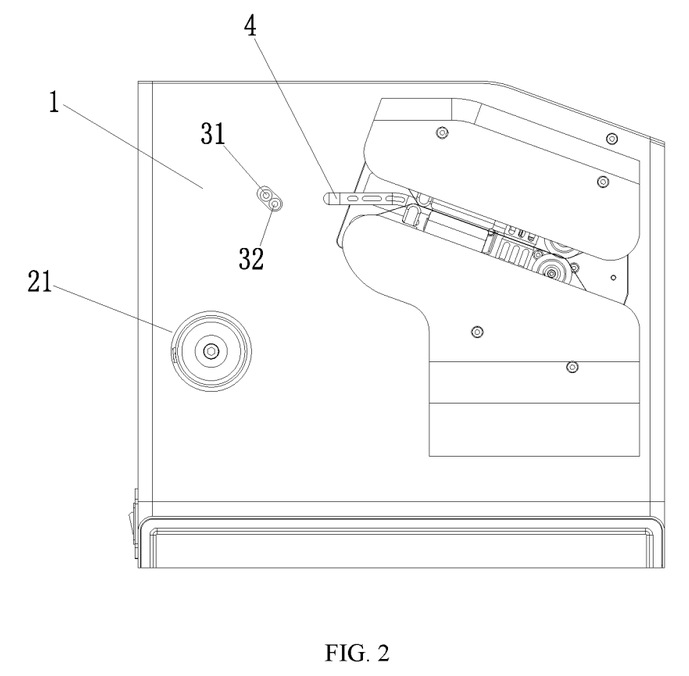
FIG. 2 is a schematic structural side view of the buffering air cushion machine shown in FIG. 1.

As shown in FIGS. 1 and 2, the guide rod comprises an upper coiling film guide rod 31 and a lower coiling film guide rod 32, both of which are mounted on the frame 1.

As shown in FIG. 2, in the present embodiment, the upper coiling film guide rod 31 and the lower coiling film guide rod 32 are arranged obliquely, thereby facilitating lateral disassembly and installation of the inflation guide rod 4. In other embodiments, the upper coiling film guide rod 31 and the lower coiling film guide rod 32 may be vertically arranged up and down.

As shown in FIGS. 1 and 2, between the upper film guide rod 31 and the lower film guide rod 32 is left a gap, which the film may pass through and be conveyed to a subsequent process. Furthermore, the upper coiling film guide rod 31 and the lower coiling film guide rod 32 may block the inflating passage connecting two air cushion films, and may prevent the air in the air cushion film which is filled with air but not sealed yet from travelling forward, so as to form a sealed high-pressure region and maintain the pressure in an inflation region, thus maintaining the pressure in the air cushion film after heat-sealing.

Figure 4:
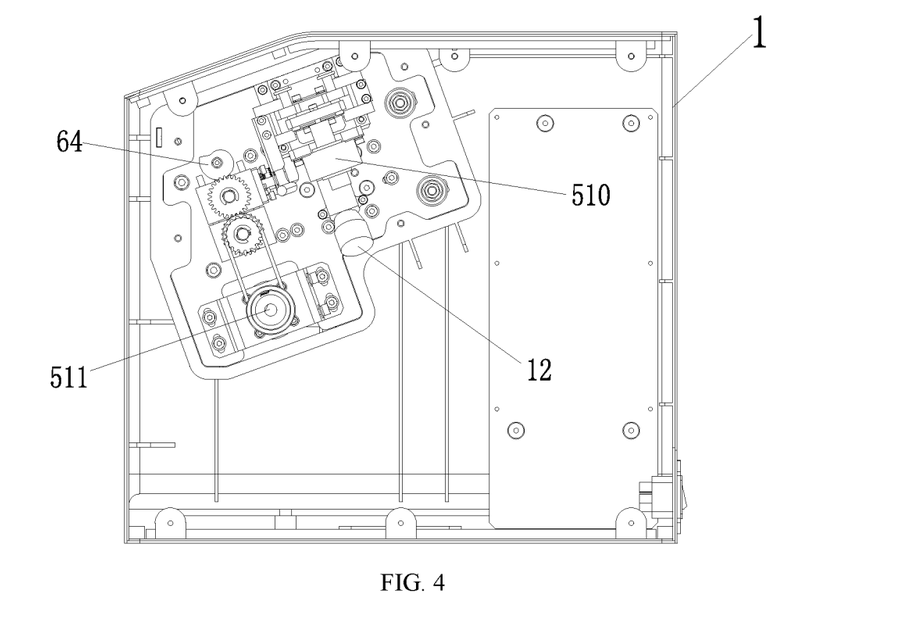
FIG. 4 is a schematic structural view of the buffering air cushion machine shown in FIG. 3, with a rear housing being hidden.
Figure 8:
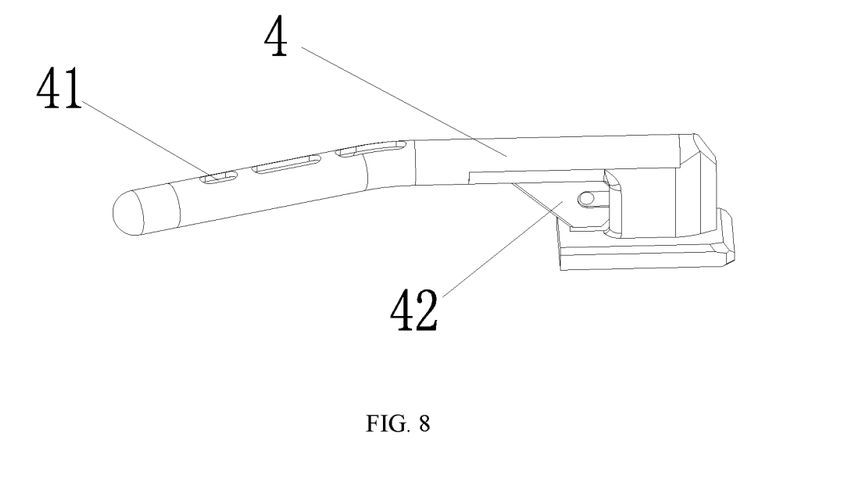
FIG. 8 is a schematic structural view of an inflation guide rod in the buffering air cushion machine shown in FIG. 1.
Figure 9:
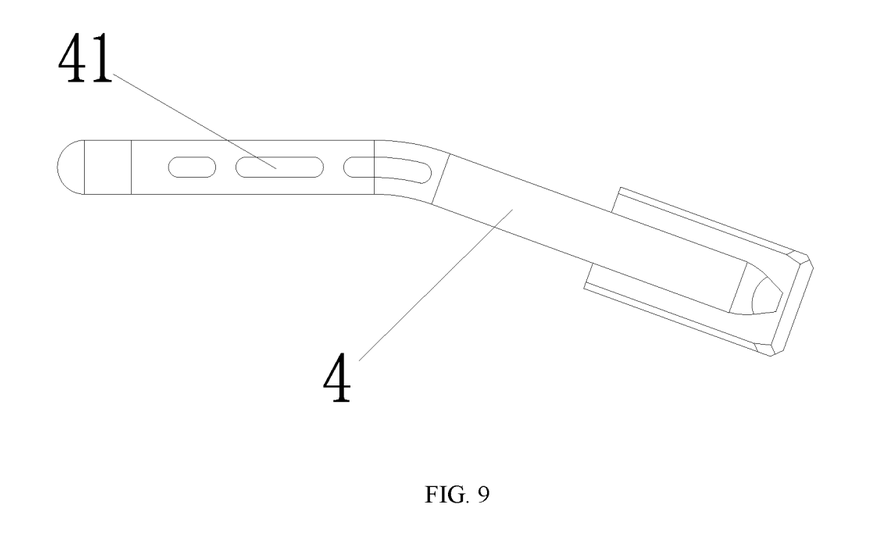
FIG. 9 is a schematic structural side view of the inflation guide rod shown in FIG. 8.
Figure 10:
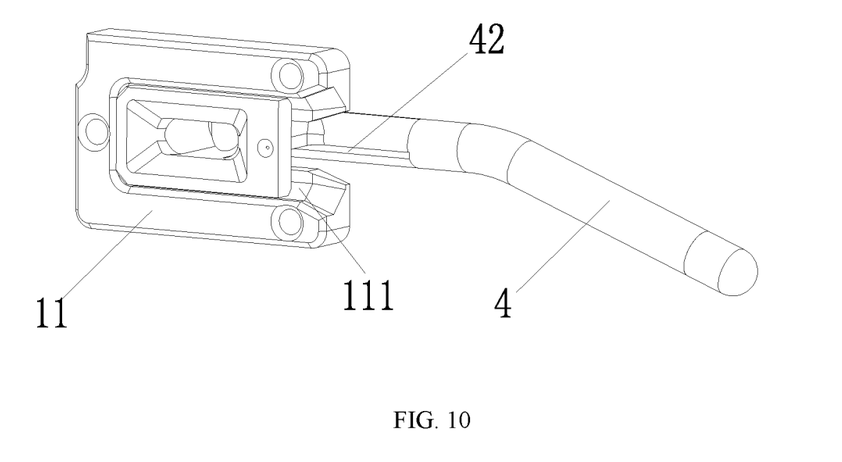
FIG. 10 is a schematic view showing a connection structure of the inflation guide rod and an inflation seat in the buffering air cushion machine shown in FIG. 1.

As shown in FIG. 9, the inflation guide rod 4 is of a bent type, the left side thereof is an inflation input end, and the right side thereof is an output end. The inflation guide rod 4 is internally formed with an inflation passage; at least one inflation hole 41 is formed on the inflation input end of the inflation guide rod 4; the output end of the inflation guide rod 4 is in communication with the blower 12 of the buffering air cushion machine (as shown in FIG. 4); the air blown by the blower 12 inflates the coiling film via the inflation hole 41. As shown in FIGS. 8 and 10, a detachable blade 42 is mounted on the output end of the inflation guide rod 4, and the detachable blade 42 may be mounted on the inflation guide rod 4 by means of a structure such as a snap, a slot, or the like. Any structure may be used as long as it facilitates replacement and installation of the detachable blade 42.

The inflation guide rod 4 of a bent type may release some tension on a sealing side (the inflating passage) of a air cushion film, and may prevent wrinkles and bends from forming on the sealing side of the air cushion film during heat-sealing, so as to improve the quality of heat-sealing.

As shown in FIG. 2, a horizontal plane, at which the inflation input end of the inflation guide rod 4 is located, is between an upper horizontal section of the upper coiling film guide rod 31 and a lower horizontal section of the lower coiling film guide rod 32, thereby ensuring that the inflation input end of the inflation guide rod 4 is smoothly inserted into the inflation passage on the coiling film between the upper coiling film guide rod 31 and the lower coiling film guide rod 32.

As shown in FIG. 9, in the present embodiment, the number of the inflation holes 41 is three. In other embodiments, the number and position of the inflation holes 41 may be set and changed according to the inflation requirements and the size of the inflation guide rod 4.

As shown in FIG. 10, an inflation seat 11 is mounted on the frame 1 by bolts; the inflation seat 11 is formed with a slot 111; the output end (left end) of the inflation guide rod 4 may be inserted laterally and fixed in the slot 111 and may also be pulled out of the slot 111. The inflation guide rod 4 is mounted on the inflation seat 11 by means of plugging; when the inflation guide rod 4 needs to be repaired or replaced (such as replacement of the blade), the inflation guide rod 4 may be disassembled by pulling it out of the slot 111, and when the inflation guide rod 4 needs to be installed, the inflation guide rod 4 may be inserted into the slot 111, so that the inflation guide rod 4 may be quickly disassembled and installed on the frame 1, thereby improving the efficiency of repair and replacement of the inflation guide rod 4.

Figure 3:
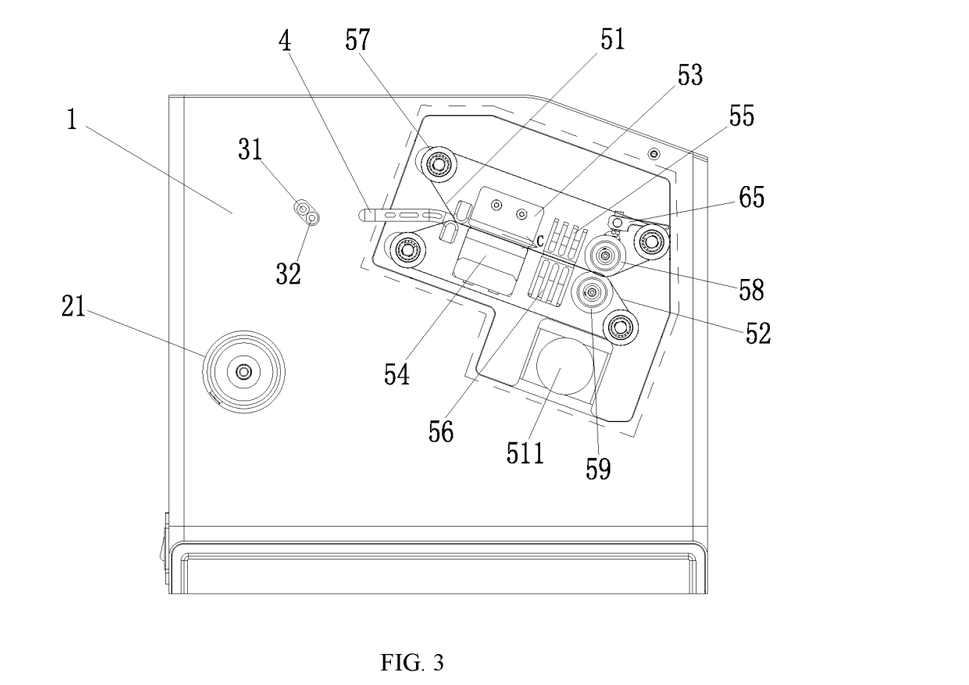
FIG. 3 is a schematic structural view of the buffering air cushion machine shown in FIG. 2, with a part of a housing being hidden.

As shown in FIG. 3, the heat-sealing cooling transmission module comprises an upper heating belt 51, a lower heating belt 52, an upper heating module 53, a lower heating module 54, an upper cooling module 55, a lower cooling module 56, a transmission wheel set 57, a first driving wheel 58, a second driving wheel 59, a first driving means 510 and a second driving means 511.

As shown in FIG. 3, the upper heating belt 51, the lower heating belt 52, the upper heating module 53, the lower heating module 54, the upper cooling module 55, the lower cooling module 56, the transmission wheel set 57, the first driving wheel 58, and the second driving wheel 59 are the core components of the buffering air cushion machine. In this embodiment, the heat-sealing cooling transmission module (the dotted line frame shown in FIG. 3) is inclinedly arranged instead of the horizontal arrangement in the conventional buffering air cushion machine. The heat-sealing cooling transmission module (the dotted line frame shown in FIG. 3) is at an angle of 35 degrees to the horizontal plane, which may greatly reduce the lateral space of the buffering air cushion machine, thereby reducing the volume of the whole machine and reducing the occupation space of the buffering air cushion machine. In other embodiments, the angle between the heat-sealing cooling transmission module (the dotted line frame shown in FIG. 3) and the horizontal plane may be set to other degrees in the range of 20 to 50 degrees according to customer requirements, overall machine size, and the like.

As shown in FIG. 3, the upper heating belt 51 and the lower heating belt 52 are sleeved on the transmission wheel set 57; the driving wheel set 57 is mounted on the frame 1; each of the transmission wheels in the transmission wheel set 57 may rotate; a conveying passage for the air cushion film is formed between the upper heating belt 51 and the lower heating belt 52; the upper heating belt 51 and the lower heating belt 52 are symmetrically distributed with respect to the output end of the inflation guide rod 4; the output end of the inflation guide rod 4 is parallelly opposite to the inlet end of the conveying passage formed by the upper heating belt 51 and the lower heating belt 52, ensuring that the inflated air cushion film smoothly enters the conveying passage for subsequent heat sealing and cooling.

As shown in FIG. 3, the upper heating module 53, the upper cooling module 55, and the first driving wheel 58 are sequentially from the left to the right disposed in the conveying direction (the direction C shown in FIG. 3) of the upper heating belt 51, while the lower heating module 54, the lower cooling module 56, and the second driving wheel 59 are sequentially from the left to the right disposed in the conveying direction (the direction C shown in FIG. 3) of the lower heating belt 52.

As shown in FIG. 3, the upper heating module 53 and the lower heating module 54 are symmetrically distributed with respect to the output end of the inflation guide rod 4, ensuring smooth heat sealing of the inflated air cushion film after entering the conveying passage.

As shown in FIGS. 3 and 4, the lower heating module 54 is fixed on the frame 1; the first driving means 510 drives through the guide rail mechanism the upper heating module 53 to reciprocate in the direction of the lower heating module 54 and perform the clamping or expanding action along with the lower heating module 54. When the upper heating module 53 and the lower heating module 54 are clamped, heat sealing of the inflated air cushion film is achieved. When the upper heating module 53 and the lower heating module 54 are expanded, the air cushion film may be removed or the upper heating belt 51 and the lower heating belt 52 may be replaced.

As shown in FIG. 4, in the present embodiment, the first driving means 510 is a linear motor, which is mounted in the housing of the frame 1 and drives through the guide rail mechanism the upper heating module 53 to reciprocate in the direction of the lower heating module 54. In other embodiments, the first driving means 510 may also be an oil cylinder or a gas cylinder which drives the upper heating module 53 to reciprocate in the direction of the lower heating module 54.

Figure 14:
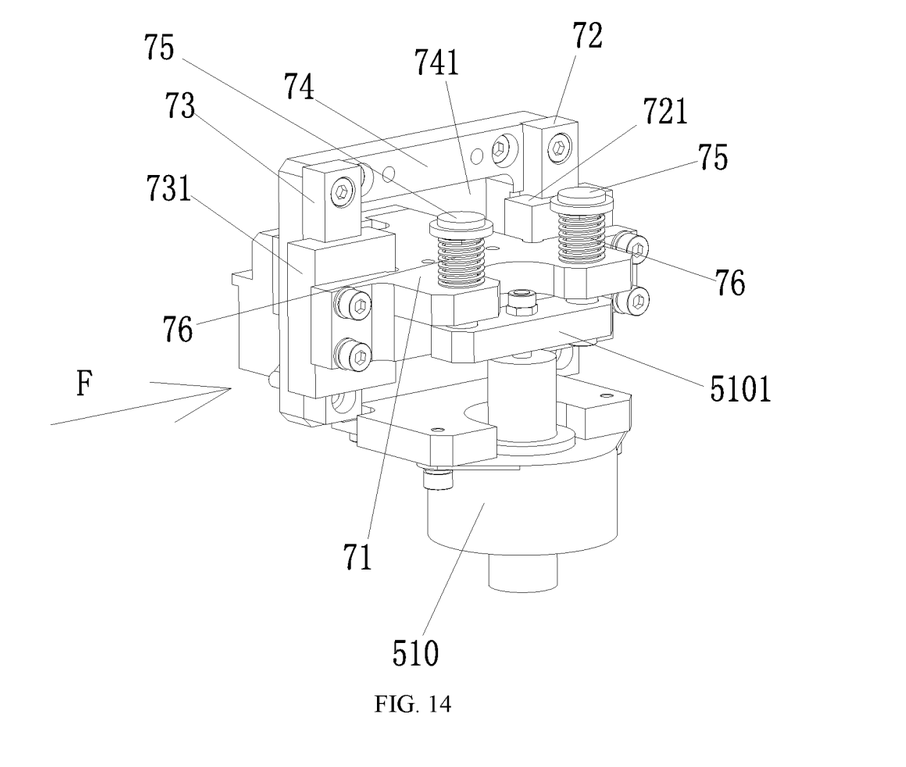
FIG. 14 is a schematic structural view of a guide rail mechanism in the buffering air cushion machine shown in FIG. 1.
Figure 15:
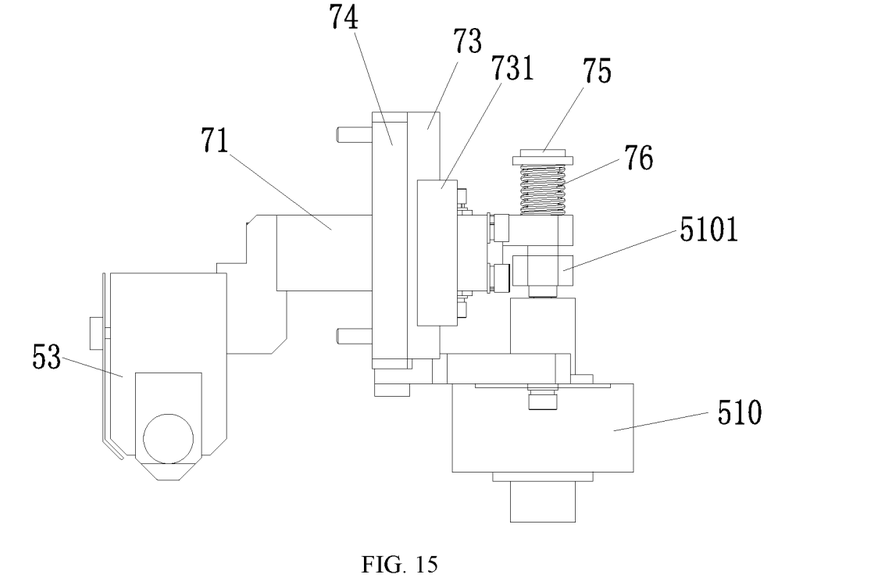
FIG. 15 is a schematic structural view of the guide rail mechanism shown in FIG. 14 in the direction F.

As shown in FIG. 14, in the present embodiment, the guide rail mechanism comprises a lifting block 71, a first linear guide rail 72, a second linear guide rail 73, a guide rail substrate 74, two sets of bolts 75 and second springs 76. The guide rail substrate 74 is formed with a square opening 741; the lifting block 71 passes through the square opening 741 and reciprocates up and down in the square opening 741; the first linear guide rail 72 is fixed on the guide rail substrate 74, and the first linear guide rail 72 is located on the right side of the square opening 741; the second linear guide rail 73 is fixed on the guide rail substrate 74, and the second linear guide rail 73 is located on the left side of the square opening 741; the first linear guide rail 72 is provided with a first slider 721, and the first slider 721 may reciprocate up and down along the first linear guide rail 72; the second linear guide rail 73 is provided with a second slider 731, and the second slider 731 may reciprocate up and down along the second linear guide rail 73; the right side of the lifting block 71 is fixed on the first slider 721, the left side thereof is fixed on the second slider 731; a driving shaft of the first driving means 510 (linear motor) is provided with a fixed block 5101; the two bolts pass through the lifting block 71 and are screwed into the fixed block 5101; the two second springs 76 are respectively sleeved on the two bolt 75, with the second springs 76 being located between nuts of the bolts 75 and the lifting block 71; the first driving means 510 (linear motor) may drive the lifting block 71 to reciprocate up and down along the first linear guide rail 72 and the second linear guide rail 73. As shown in FIG. 15, the upper heating module 53 is fixed on the lifting block 71 and reciprocates up and down along with the lifting block 71, so that it is achieved that the upper heating module 53 reciprocates in the direction of the lower heating module 54 and performs the clamping or expanding action along with the lower heating module 54. The lifting block 71 does not sway laterally during the ascending or descending due to the lateral limit of the first linear guide rail 72 and the second linear guide rail 73, and the lifting block 71 is located in the square opening 741 of the guide rail substrate; during the ascending, when the lifting block 71 touches the upper edge of the square opening 741, the first driving means 510 (linear motor) stops, and the upper edge of the square opening 741 may eliminate the longitudinal jumping of the lifting block 71 due to inertia; during the descending, when the lifting block 71 touches the lower edge of the square opening 741, the first driving means 510 (linear motor) stops, and the lower edge of the square opening 741 may eliminate the longitudinal jumping of the lifting block 71 due to inertia. The lifting block 71 does not sway laterally during the ascending or descending. After the first driving means 510 (linear motor) is stopped, the lifting block 71 does not jump longitudinally, so that the heat-sealing effect of the upper heating module 53 on the lifting block 71 may be ensured. Meanwhile the two second springs 76 may press the lifting block 71 tightly on the fixed block 5101; in the process that the lifting block 71 and the rotating shaft of the first driving means 510 (linear motor) are descending synchronously, the lifting block 71 does not fall freely, and the second springs 76 may prevent the first driving means 510 (linear motor) from being directly rigidly connected to the lifting block 71 in order to avoid collision and out-of-step phenomena, and may apply a stable downward pressure to the upper heating module 53, thereby completing the heat sealing of the air cushion film. In other embodiments, the guide rail mechanism may also adopt any other configuration as long as it may drive the upper heating module 53 to reciprocate toward the lower heating module 54.

The guide rail substrate 74 is fixed to the frame 1, and the guide rail mechanism is located in the housing of the frame 1.

Figure 13:
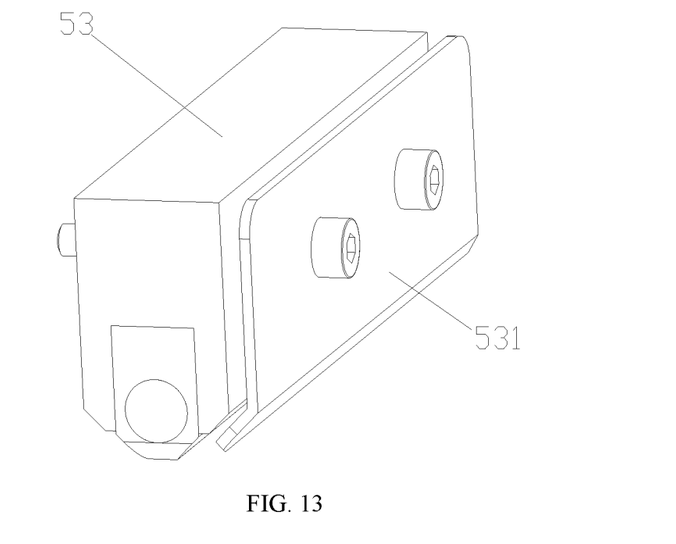
FIG. 13 is a schematic structural view of an upper heating module in the buffering air cushion machine shown in FIG. 1.

As shown in FIG. 13, the upper heating module 53 is provided with a heat insulating plate 531, which may effectively reduce the external heat radiation of the upper heating module 53, reduce the heat loss of the upper heating module 53, shorten the temperature rise time of the upper heating module 53, and maintain the temperature of the upper heating module 53 after its temperature rise to a relatively stable temperature, thereby improving the heat-sealing efficiency and the heat-sealing effect of the air cushion film. The heating by the upper heating module 53 is achieved through an internal heating tube, inside which is disposed a heating coil. When the upper heating module 53 and the lower heating module 54 are clamped, the heat of the upper heating module 53 is transferred via the upper heating belt 51 to the air cushion film between the upper heating belt 51 and the lower heating belt 52 to achieve heat sealing.

As shown in FIG. 3, the upper cooling module 55 and the lower cooling module 56 are symmetrically distributed with respect to the output end of the inflation guide rod 4, ensuring smooth cooling and setting of the inflated air cushion film in the conveying passage.

As shown in FIG. 3, the first driving wheel 58 and the second driving wheel 59 are symmetrically distributed with respect to the output end of the inflation guide rod 4; the second driving means 511 drives via the gear set the first driving wheel 58 and the second driving wheel 59 to rotate; the first driving wheel 58 and the second driving wheel 59 are in a squeezed state; the rotation of the first driving wheel 58 drives the upper heating belt 51 to drive by the action of the friction force, and the rotation of the second driving wheel 59 drives the lower heating belt 52 by the action of the friction force; the first driving wheel 58 and the second driving wheel 59 rotate in opposite directions. Under the cooperation of the transmission wheel set 57, a conveying passage of the air cushion film is formed between the upper heating belt 51 and the lower heating belt 52, so that the coiling film may be introduced into the conveying passage. The second drive means 511 is a motor mounted on the frame 1.

In this embodiment, the first driving wheel 58 and the second driving wheel 59 are both rubber wheels. The rubber wheels are used to drive the upper heating belt 51 and the lower heating belt 52; when the upper heating belt 51 and the lower heating belt 52 are attached together, the two rubber wheels are in a state of being squeezed and deformed, therefore, the contact area between the rubber wheels on the one hand and the upper heating belt 51 and the lower heating belt 52 on the other hand may be improved, the transmission friction force is improved, with the first driving wheel 58 and the second driving wheel 59 being prevented from slipping. In other embodiments, the first driving wheel 58 and the second driving wheel 59 may also be made of rubber material, and the material of the upper heating belt 51 and the lower heating belt 52 may be driven by the pressing friction force. Any material that may drive the upper heating belt 51 and the lower heating belt 52 by the pressing friction force may be used.

Figure 11:
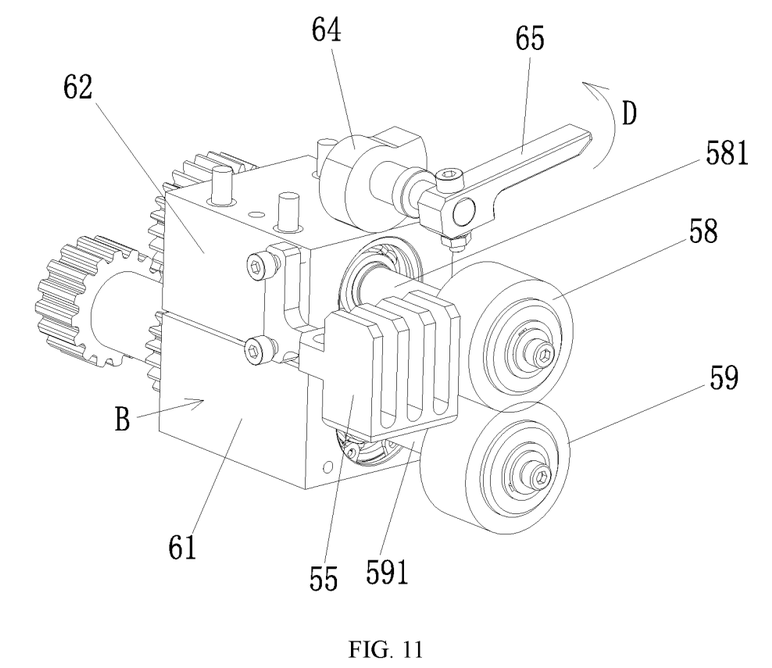
FIG. 11 is a schematic structural view of a driving mechanism in the buffering air cushion machine shown in FIG. 1.
Figure 12:
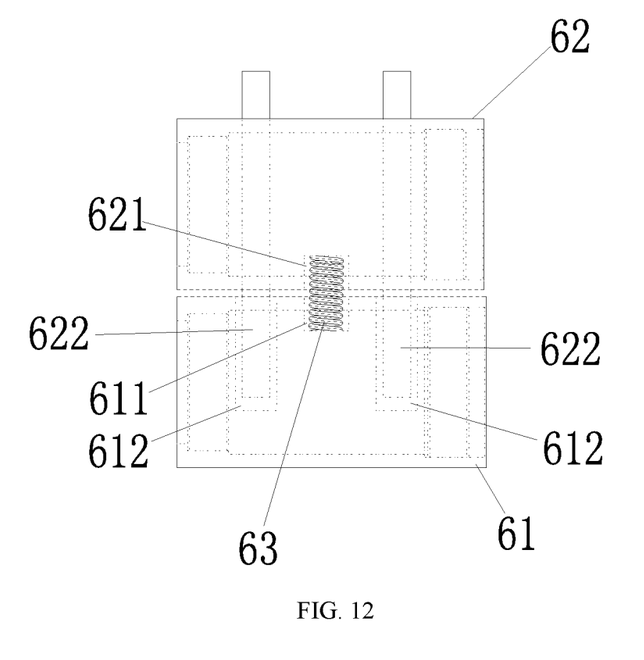
FIG. 12 is a schematic structural view of the driving mechanism shown in FIG. 11 in the B direction.

As shown in FIGS. 11 and 12, the upper cooling module 55 is driven by the driving mechanism to reciprocate in the direction of the lower cooling module 56 and perform the clamping or expanding action along with the lower cooling module 56. When the upper cooling module 55 and the lower cooling module 56 are clamped, cooling and setting of the inflated air cushion film is achieved. When the upper cooling module 55 and the lower cooling module 56 are expanded, the air cushion film may be removed or the upper heating belt 51 and the lower heating belt 52 may be replaced.

As shown in FIGS. 11 and 12, in this embodiment, the driving mechanism comprises a base 61, a pressing block 62, at least one first spring 63, a cam 64 and a handle 65, wherein a rotating shaft 591 of the second driving wheel 59 is inserted into the base 61 and is rotatably connected to the base 61 via a bearing, the base 61 is fixed on the frame 1, a rotating shaft 581 of the first driving wheel 58 is inserted into the pressing block 62 and is rotatably connected to the pressing block 62 via a bearing.

As shown in FIG. 12, in the embodiment, the top of the base 61 is formed with two first recesses 611, the bottom of the pressing block 62 is formed with two second recesses 621 corresponding to the position of the first recesses 611, the number of the first spring 63 is also two, the lower end of the first spring 63 is located in the first recess 611, the upper end thereof is located in the second recess 621, the first spring 63 is in a compressed state, and the two first recesses 611 are located on both sides of the rotating shaft 591. In other embodiments, the number of the first recess 611, the second recess 621, and the first spring 63 may also be one or three or more, and the number of the first recess 611, the second recess 621, and the first spring 63 is the same.

As shown in FIG. 12, in the embodiment, the bottom of the pressing block 62 is formed with four positioning rods 622, the four positioning rods 622 are distributed at the four corners of the pressing block 62, the top of the base 61 is formed with four third recesses 612, the positioning rod 622 is inserted in the third recess 612 and is in clearance fit with the third recess 612, and the positioning rod 622 may move up and down in the third recess 612. In other embodiments, the number of the positioning rod 622 and the third recess 612 may also be one or three or more, the number of the positioning rod 622 and the third recess 612 is the same.

As shown in FIG. 11, the pressing block 62 is located at the top of the base 61, the cam 64 is located at the top of the pressing block 62, the cam 64 is in contact with and connected to the pressing block 62, the handle 65 drives via a rotating shaft the cam 64 to rotate, and the rotating shaft is fixed on the frame 1 via a bearing. The handle 65 is rotated along the direction D, and the cam 64 rotates synchronously; since the radius of contact between the cam 64 and the pressing block 62 is changed from large to small, the pressing block 62 is lifted under the restoring force of the two first springs 63, and accordingly the first driving wheel 58 is also lifted; at this time, the upper heating belt 51 and the lower heating belt 52 are separated, so that the air cushion film may be removed or the upper heating belt 51 and the lower heating belt 52 may be replaced.

As shown in FIG. 11, the upper cooling module 55 is fixed via a connecting rod to the pressing block 62. While the pressing block 62 is lifted, the upper cooling module 55 is also lifted together and separated from the lower cooling module 56, so that the air cushion film may be removed or the upper heating belt 51 and the lower heating belt 52 may be replaced.

Figure 16:
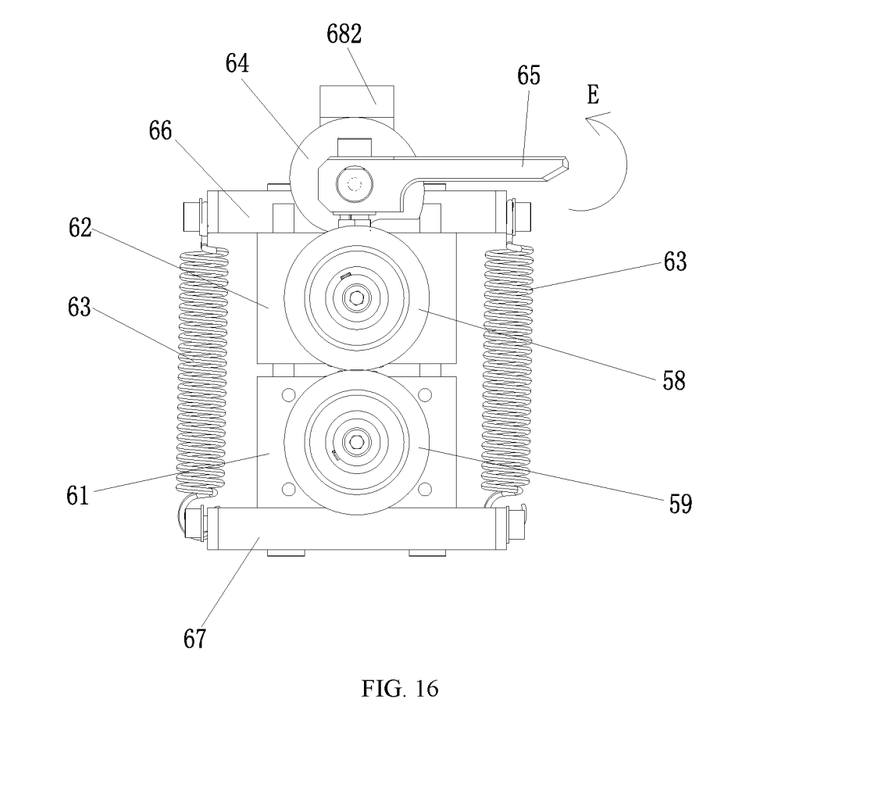
FIG. 16 is another schematic structural view of the driving mechanism in the buffering air cushion machine shown in FIG. 1.
Figure 17:
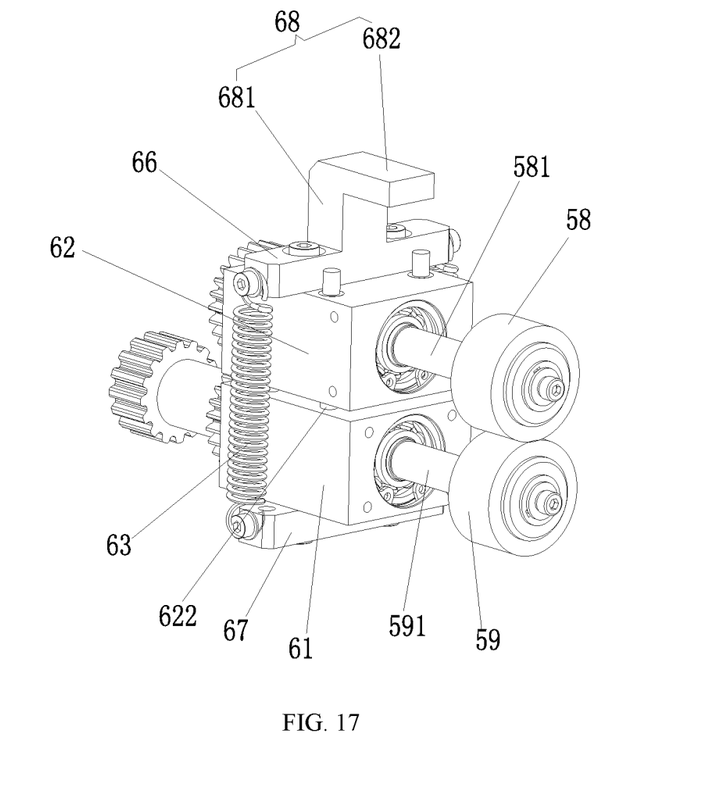
FIG. 17 is a schematic structural side view of the driving mechanism shown in FIG. 16.

As shown in FIGS. 16 and 17, in other embodiments, the driving mechanism may also comprise the base 61, the pressing block 62, the two first springs 63, a first beam 66, a second beam 67, a limiting member 68, the cam 64 and the handle 65. A rotating shaft 591 of the second driving wheel 59 is inserted into the base 61 and is rotatably connected to the base 61 via a bearing; the base 61 is fixed on the frame 1; the rotating shaft 581 of the first driving wheel 58 is inserted into the pressing block 62 and is rotatably connected to the pressing block 62 via a bearing. The bottom of the pressing block 62 is formed with a plurality of positioning rods 622; the top of the base 61 is formed with third recesses 612 of the same number as the positioning rods 622; the positioning rods 622 are inserted into the third recesses 612 and in clearance fit with the third recesses 612; the positioning rods 622 may move up and down in the third recesses 612. The pressing block 62 is located at the top of the base 61; the first beam 66 is located at the top of the pressing block 62; the left and right ends of the first beam 66 respectively extend from both sides of the pressing block 62; the second beam 67 is located at the bottom of the base 61; the left and right ends of the second beam 67 respectively extend from both sides of the base 61; the first beam 66 and the second beam 67 are arranged in parallel (as shown in FIG. 17). As shown in FIG. 16, the upper end of one of the first springs 63 is fixed to the left end of the first beam 66; the lower end of this first spring 63 is fixed on the left end of the second beam 67; the upper end of the other first spring 63 is fixed on the right end of the first beam 66; the lower end of this first spring 63 is fixed on the right end of the second beam 67; the two first springs 63 are both in a stretched state. As shown in FIG. 17, the limiting member 68 comprises a vertical rod 681 and a cross rod 682; the vertical rod 681 and the cross rod 682 are integrally connected in an L shape; the lower end of the vertical rod 681 is fixed on the first beam 66 (or integrally connected); the cross rod 682 is located above the cam 64; the cross rod 682 is in contact with and connected to the upper edge of the cam 64; the cam 64 is not located between the pressing block 62 and the cross rod 682; the handle 65 drives via a rotating shaft the cam 64 to rotate; the rotating shaft is fixed on the frame 1 via a bearing. The handle 65 is rotated along the direction E, and the cam 64 rotates synchronously; since the radius of contact between the cam 64 and the cross rod 682 is changed from small to large, the cam 64 forcibly lifts the cross rod 682; at this time the pressing block 62 is lifted, and the pressing block 62 drives the first driving wheel 58 to be lifted as well; at this time, the upper heating belt 51 and the lower heating belt 52 are separated, so that the air cushion film may be removed or the upper heating belt 51 and the lower heating belt 52 may be replaced. The upper cooling module 55 is fixed on the pressing block 62 via a connecting rod (same as FIG. 11 and not shown in FIGS. 16 and 17). When the pressing block 62 is lifted, the upper cooling module 55 is also lifted together and separated from the lower cooling module 56, so that the air cushion film may be removed, or, the upper heating belt 51 and the lower heating belt 52 may be replaced. The handle 65 is pressed in the opposite direction of the direction E; since the radius of contact between the cam 64 and the cross rod 682 is changed from large to small, the cross rod 682 moves downward under the tension of the two first springs 63, and the pressing block 62 simultaneously moves downward against the base 61; at this time, the first driving wheel 58 moves toward the second driving wheel 59, and the upper cooling module 55 moves towards the lower cooling module 56, so that the upper heating belt 51 may be closely attached to the lower heating belt 52, thereby driving the air cushion film to be conveyed, and achieving heat sealing, cooling and setting of the air cushion film. Besides, under the tension of the two first springs 63, the first driving wheel 58 is always subjected to the pressure in the direction of the second driving wheel 59, ensuring that the upper heating belt 51 and the lower heating belt 52 are always in close attachment, and that the first driving wheel 58 has sufficient friction to drive the upper heating belt 51, and the second driving wheel 59 has sufficient friction to drive the lower heating belt 52, so as to avoid slipping; when the first driving wheel 58 and the second driving wheel 59 are worn, the diameters thereof becomes smaller, and the two first springs 63 will automatically pull the first driving wheel 58 toward the second driving wheel 59, so that the upper heating belt 51 and the lower heating belt 52 are always in a close attachment state.

In the present embodiment, the upper cooling module 55 is driven by the driving mechanism to reciprocate in the direction of the lower cooling module 56. In other embodiments, the upper cooling module 55 may also driven by other driving devices (such as a motor, a cylinder, an oil cylinder, a gas cylinder etc.) to reciprocate in the direction of the lower cooling module 56, and perform the clamping or expanding action along with the lower cooling module 56.

As shown in FIG. 1, an operation panel 13 is mounted on the top of the frame 1. The operation panel 13 is electrically connected to the blower 12, the first driving means 510 and the second driving means 511, and sequentially controls the start and stop of the blower 12, the first driving means 510 and the second driving means 511.

As shown in FIG. 3, the barrel body is covered with the coiling film consumable; the elastic sheet 26 clamps a sleeve of the coiling film consumable; the free end of the coiling film consumable is passed between the upper coiling film guide rod 31 and the lower coiling film guide rod 32; the inflation guide rod 4 is inserted in the inflation passage of the coiling film consumable. When the buffering air cushion machine is activated, the inflation guide rod 4 inflates the coiling film consumable; the detachable blade 42 on the inflation guide rod 4 cuts the inflated air cushion film; the inflated air cushion film enters the conveying passage between the upper heating belt 51 and the lower heating belt 52; the inflated air cushion film is heat-sealed by the upper heating module 53 and the lower heating module 54; the heat-sealed air cushion film is subjected to the cooling and setting by the upper cooling module 55 and the lower cooling module 56. The heat-sealed air cushion film is conveyed backward in the direction C until the output end under the driving by the upper heating belt 51 and the lower heating belt 52. When it is necessary to remove the air cushion film between the upper heating belt 51 and the lower heating belt 52 or replace the upper heating belt 51 and the lower heating belt 52, the upper heating module 53 and the lower heating module 54 may be separated. By pulling the handle 65, the upper cooling module 55 and the lower cooling module 56 are separated, and the first driving wheel 58 and the second driving wheel 59 are separated, so that the upper heating belt 51 and the lower heating belt 52 are separated. Then, the air cushion film may be removed or the upper heating belt 51 and the lower heating belt 52 may be replaced.

In the above description are described only some embodiments of the present utility model. It will be apparent to those skilled in the art that various modifications and improvements may be made without departing from the inventive concept of the present utility model, and that these are within the scope of the present utility model.

What is claimed is:

1. A buffering air cushion machine, comprising a frame (1), which is provided with a barrel, a guide rod combination, an inflation guide rod (4) and a heat-sealing cooling transmission module, wherein an angle between the heat-sealing cooling transmission module and a horizontal plane is 20-50 degrees; the guide rod combination comprises an upper coding film guide rod (31) and a lower coiling film guide rod (32); the inflation guide rod (4) is in a bent shape, a horizontal plane at which an inflation input end of the inflation guide rod (4) is located between an upper horizontal section of the upper coiling film guide rod (31) and a lower horizontal section of the lower coiling film guide rod (32); an output end of the inflation guide rod (4) is opposite to an inlet end of the heat-sealing cooling transmission module,
    wherein the heat-sealing cooling transmission module comprises an upper heating belt (51), a lower heating belt (52), an upper heating module (53), a lower heating module (54), an upper cooling module (55), a lower cooling module (56), a transmission wheel set (57), a first driving wheel (58), a second driving wheel (59), a first driving means (510) and a second driving means (511), wherein the upper heating belt (51) and the lower heating belt (52) are sleeved on the transmission wheel set (57), the upper heating belt (51) and the lower heating belt (52) are symmetrically distributed with respect to the output end of the inflation guide rod (4), and between the upper heating belt (51) and the lower heating belt (52) is formed a conveying path for a air cushion film; wherein the upper heating module (53), the upper cooling module (55) and the first driving wheel (58) are sequentially disposed in a conveying direction of the upper heating belt (51), and the lower heating module (54), the lower cooling module (56) and the second driving wheel (59) are sequentially disposed in a conveying direction of the lower heating belt (52); wherein the upper heating module (53) and the lower heating module (54) are symmetrically distributed with respect to the output end of the inflation guide rod (4), the upper cooling module (55) and the lower cooling module (56) are symmetrically distributed with respect to the output end of the inflation guide rod (4), and the first driving wheel (58) and the second driving wheel (59) are symmetrically distributed with respect to the output end of the inflation guide rod (4); wherein the second driving means (511) drives the first driving wheel (58) and the second driving wheel (59) to rotate, the first driving wheel (58) drives the upper heating belt (51) to move, the second driving wheel (59) drives the lower heating belt (52) to move, and the transmission wheel set (57) is rotatably connected to the frame (1),
    wherein the first driving means (510) drives by means of a rail mechanism the upper heating module (53) to reciprocate in a direction toward the lower heating module (54) and perform the clamping or expanding operation with the lower heating module (54), and
    wherein the heat-sealing cooling transmission module further comprises a driving mechanism which drives the upper cooling module (55) to reciprocate in a direction toward the lower heating module (54) and perform the clamping or expanding operation along with the lower heating module (54).

2. The buffering air cushion machine according to claim 1, wherein the barrel comprises a barrel body (21), a fixed shaft (22), a bearing (23), a first ring body (24) and a second ring body (25), wherein one end of the fixed shaft (22) is disposed on the frame (1), the first ring body (24) is sleeved on the fixed shaft (22), and the second ring body (25) is sleeved on the fixed shaft (22); the second ring body (25) is rotatably connected to the fixed shaft (22), the barrel body (21) is rotatably connected to the fixed shaft (22) via the bearing (23), an outer circumference of the second ring body (25) is in contact with an inner wall of the barrel body (21), the barrel body (21) drives the second ring body (25) to rotate synchronously, and a side face of the first ring body (24) is in contact with a side face of the second ring body (25).

3. The buffering air cushion machine according to claim 2, wherein the barrel body (21) is provided with an elastic sheet (26).

4. The buffering air cushion machine according to claim 1, wherein the driving mechanism comprises a base (61), a pressing block (62), at least one first spring (63), a cam (64) and a handle (65), wherein a rotating shaft of the second driving wheel (59) is inserted into the base (61) and is rotatably connected to the base (61) which is provided on the frame (1); a rotating shaft of the first driving wheel (58) is inserted into the pressing block (62) and is rotatably connected to the pressing block (62); the top of the base (61) is provided with at least one first recess (611), and the bottom of the pressing block (62) is provided with at least one second recess (621) corresponding to the position of the first recess (611); one end of the first spring (63) is located in the first recess (611) and the other end thereof is located in the second recess (621); the first spring (63) is in a compressed state; the bottom of the pressing block (62) is provided with a plurality of positioning rods (622), the top of the base (61) is provided with a plurality of third recesses (612), and the positioning rods (622) are located in the third recesses (612) and are in clearance fit with the third recesses (612); the pressing block (62) is located at the top of the base (61), and the cam (64) is provided at the top of the pressing block (62); the handle (65) drives the cam (64) to rotate; the upper cooling module (55) is disposed on the pressing block (62) via a connecting rod.

5. The buffering air cushion machine according to claim 1, wherein the driving mechanism comprises base (61), pressing block (62), two first springs (63), a first beam (66), a second beam (67), a limiting member (68), cam (64) and handle (65), wherein the rotating shaft of the second driving wheel (59) is inserted into the base (61) and is rotatably connected to the base (61), which is provided on the frame (1); the rotating shaft of the first driving wheel (58) is inserted into the pressing block (62) and is rotatably connected to the pressing block (62); the bottom of the pressing block (62) is provided with plurality of positioning rods (622); the top of the base (61) is provided with plurality of third recesses (612); the positioning rods (622) are located in the third recesses (612) and are in clearance fit with the third recesses (612), the pressing block (62) is located at the top of the base (61); the first beam (66) is provided at the top of the pressing block (62), and both ends of the first beam (66) extend out of the pressing block (62); the second beam (67) is provided at the bottom of the base (61), and both ends of the second beam (67) extend out of the base (61); the first beam (66) and the second beam (67) are arranged in parallel, with one end of one of the first springs (63) being provided on one end of the first beam (66) and the other end of this first spring (63) being provided on one end of the second beam (67), as well as one end of the other first spring (63) being provided on the other end of the first beam (66) and the other end of this first spring (63) being provided on the other end of the second beam (67); the first spring (63) is in a stretched state; the limiting member (68) comprises a vertical rod (681) and a cross rod (682) which are connected in an L shape, and the vertical rod (681) is provided on the first beam (66); the cam (64) is located below the cross rod (682); the handle (65) drives the cam (64) to rotate; the upper cooling module (55) is disposed on the pressing block (62) via the connecting rod.

6. The buffering air cushion machine according to claim 1, wherein the guide rail mechanism comprises a lifting block (71), a first linear guide rail (72), a second linear guide rail (73), a guide rail substrate (74), two sets of bolts (75) and second springs (76), wherein the guide rail substrate (74) is provided with a square opening (741), and the lifting block (71) passes through the square opening (741) and reciprocates up and down in the square opening (741); the first linear guide rail (72) is provided on the guide rail substrate (74) and located on one side of the square opening (741); the second linear guide rail (73) is provided on the guide rail substrate (74) and located on the other side of the square opening (741); the first linear guide rail (72) is provided with a first slider (721), which reciprocates up and down along the first linear guide rail (72), and the second linear guide rail (73) is provided with a second slider (731), which reciprocates up and down along the second linear guide rail (73); one side of the lifting block (71) is disposed on the first slider (721), the other side thereof is disposed on the second slider (731); the first driving means (510) drives the lifting block (71) to reciprocate up and down along the first linear guide rail (72) and the second linear guide rail (73); the upper heating module (53) is provided on the lifting block (71) and reciprocates up and down along with the lifting block (71); a driving shaft of the first driving means (510) is provided with a fixed block (5101), and the bolt (75) passes through the lifting block (71) and is screwed into the fixed block (5101); the second springs (76) are located between nuts of the bolt (75) and the lifting block (71); the guide rail substrate (74) is disposed on the frame (1).

7. The buffering air cushion machine according to claim 1, wherein the first driving wheel (58) and the second driving wheel (59) are rubber wheels.

8. The buffering air cushion machine according to claim 1, wherein a heat insulating plate (531) is provided on the upper heating module (53).

9. The buffering air cushion machine according to claim 1, wherein the inflation input end of the inflation guide rod (4) is provided with at least one inflation hole (41), and wherein the output end of the inflation guide rod (4) is in communication with a blower of the buffering air cushion machine and is provided at the output end of the inflation guide rod (4).

10. The buffering air cushion machine according to claim 1, wherein the frame (1) is provided with an inflation seat (11), with a slot (111) being provided on the inflation seat (11), and wherein the output end of the inflation guide rod (4) is inserted into the slot (111) and is detachably connected to the slot (111).

11. The buffering air cushion machine according to claim 4, wherein the first driving wheel (58) and the second driving wheel (59) are rubber wheels.

12. The buffering air cushion machine according to claim 5, wherein the first driving wheel (58) and the second driving wheel (59) are rubber wheels.

13. The buffering air cushion machine according to claim 6, wherein the first driving wheel (58) and the second driving wheel (59) are rubber wheels.

14. The buffering air cushion machine according to claim 4, wherein a heat insulating plate (531) is provided on the upper heating module (53).

15. The buffering air cushion machine according to claim 5, wherein a heat insulating plate (531) is provided on the upper heating module (53).

16. The buffering air cushion machine according to claim 6, wherein a heat insulating plate (531) is provided on the upper heating module (53).

* * * * *